(12) United States Patent
Matviychuk et al.

(10) Patent No.: US 10,043,243 B2
(45) Date of Patent: Aug. 7, 2018

(54) DEEP UNFOLDING ALGORITHM FOR EFFICIENT IMAGE DENOISING UNDER VARYING NOISE CONDITIONS

(71) Applicant: Siemens Healthcare GmbH

(72) Inventors: Yevgen Matviychuk, Christchurch (NZ); Boris Mailhe, Plainsboro, NJ (US); Xiao Chen, Somerset, NJ (US); Qiu Wang, Princeton, NJ (US); Mariappan S. Nadar, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 57 days.

(21) Appl. No.: 15/176,216

(22) Filed: Jun. 8, 2016

(65) Prior Publication Data

US 2017/0213321 A1    Jul. 27, 2017

Related U.S. Application Data

(60) Provisional application No. 62/281,889, filed on Jan. 22, 2016.

(51) Int. Cl.
*G06K 9/00* (2006.01)
*G06T 5/00* (2006.01)
(Continued)

(52) U.S. Cl.
CPC .................. *G06T 5/00* (2013.01); *G06K 9/52* (2013.01); *G06K 9/6215* (2013.01); *G06K 9/66* (2013.01);
(Continued)

(58) Field of Classification Search
CPC . G06T 5/00; G06T 5/002; G06T 2207/20021; G06T 2207/20081;
(Continued)

(56) References Cited

U.S. PATENT DOCUMENTS 6,879,729 B2 * 4/2005 Kamath ................... G06K 9/40
382/254
8,629,937 B1 * 1/2014 Zhou ....................... H04N 7/014
348/448

(Continued)

OTHER PUBLICATIONS

J. Schmidhuber, "Deep learning in neural networks: An overview," Neural Networks, vol. 61, pp. 85-117, 2015, published online 2014; based on TR arXiv:1404.7828 [cs.NE].

(Continued)

*Primary Examiner* — Iman K Kholdebarin

(57) ABSTRACT

A computer-implemented method for denoising image data includes a computer system receiving an input image comprising noisy image data and denoising the input image using a deep multi-scale network comprising a plurality of multi-scale networks sequentially connected. Each respective multi-scale network performs a denoising process which includes dividing the input image into a plurality of image patches and denoising those image patches over multiple levels of decomposition using a threshold-based denoising process. The threshold-based denoising process denoises each respective image patch using a threshold which is scaled according to an estimation of noise present in the respective image patch. The noising process further comprises the assembly of a denoised image by averaging over the image patches.

20 Claims, 9 Drawing Sheets

(51) Int. Cl.
*G06K 9/52* (2006.01)
*G06K 9/66* (2006.01)
*G06K 9/62* (2006.01)
*G06K 9/46* (2006.01)

(52) U.S. Cl.
CPC .............. *G06K 2009/4666* (2013.01); *G06T 2207/20021* (2013.01); *G06T 2207/20081* (2013.01)

(58) Field of Classification Search
CPC ............ G06K 2009/4666; G06K 9/52; G06K 9/6215; G06K 9/66
USPC ........................................................ 382/159
See application file for complete search history.

(56) References Cited

U.S. PATENT DOCUMENTS

| | | | | |
|---|---|---|---|---|
| 9,569,843 | B1* | 2/2017 | Mailhe | G06T 5/002 |
| 9,633,306 | B2* | 4/2017 | Liu | G06N 3/084 |
| 9,723,330 | B2* | 8/2017 | Xu | H04N 19/86 |
| 9,852,353 | B2* | 12/2017 | Lin | G06K 9/52 |
| 2003/0026493 | A1* | 2/2003 | Kamath | G06K 9/40 |
| | | | | 382/260 |
| 2005/0181399 | A1* | 8/2005 | Okimoto | G01N 33/6803 |
| | | | | 435/6.16 |
| 2008/0151101 | A1* | 6/2008 | Tian | H04N 5/145 |
| | | | | 348/448 |
| 2008/0239094 | A1* | 10/2008 | Baqai | H04N 1/00 |
| | | | | 348/223.1 |
| 2011/0026850 | A1* | 2/2011 | Weinberger | G06K 9/40 |
| | | | | 382/261 |
| 2011/0075935 | A1* | 3/2011 | Baqai | G06T 7/0002 |
| | | | | 382/195 |
| 2011/0172110 | A1* | 7/2011 | Merriman | B01J 19/0046 |
| | | | | 506/9 |
| 2011/0222597 | A1* | 9/2011 | Xu | H04N 19/70 |
| | | | | 375/240.01 |
| 2012/0207396 | A1* | 8/2012 | Dong | G06T 5/002 |
| | | | | 382/218 |
| 2012/0224784 | A1* | 9/2012 | Cohen | G06T 5/002 |
| | | | | 382/260 |
| 2013/0089247 | A1* | 4/2013 | Mercuriev | G06T 5/002 |
| | | | | 382/128 |
| 2015/0110386 | A1* | 4/2015 | Lin | G06T 5/002 |
| | | | | 382/159 |
| 2015/0238091 | A1* | 8/2015 | Iyer | A61B 5/0095 |
| | | | | 600/407 |
| 2015/0262336 | A1* | 9/2015 | Jin | G06T 3/4053 |
| | | | | 382/275 |
| 2015/0312495 | A1* | 10/2015 | Pan | G06T 3/00 |
| | | | | 348/241 |
| 2016/0132995 | A1* | 5/2016 | Lin | G06K 9/46 |
| | | | | 382/203 |
| 2016/0314379 | A1* | 10/2016 | Wong | G06K 9/6276 |

OTHER PUBLICATIONS

H. Burger, C. Schuler, and S. Harmeling, "Image denoising: Can plain neural networks compete with BM3D?" in Comp. Vision and Pattern Recogn. (CVPR), 2012 IEEE Conf. on, Jun. 2012, pp. 2392-2399.

P. Sprechmann, A. Bronstein, and G. Sapiro, "Learning efficient sparse and low rank models," Pattern Analysis and Machine Intelligence, IEEE Transactions on, vol. 37, No. 9, pp. 1821-1833, Sep. 2015.

J.R. Hershey, J. Le Roux, and F. Weninger, "Deep unfolding: Model-based inspiration of novel deep architectures," ArXiv e-prints, Sep. 2014.

Z. Wang, D. Liu, J. Yang, W. Han, and T. Huang, "Deeply improved sparse coding for image super-resolution," ArXiv e-prints, Jul. 2015.

D. Donoho, "De-noising by soft-thresholding," Information Theory, IEEE Transactions on, vol. 41, No. 3, pp. 613-627, May 1995.

P. Vincent, H. Larochelle, I. Lajoie, Y. Bengio, and P.-A. Manzagol, "Stacked denoising autoencoders: Learning useful representations in a deep network with a local denoising criterion," J. Mach. Learn. Res., vol. 11, pp. 3371-3408, Dec. 2010.

J. Portilla, V. Strela, M. Wainwright, and E. Simoncelli, "Image denoising using scale mixtures of gaussians in the wavelet domain," Im. Proc., IEEE Trans. on, vol. 12, No. 11, pp. 1338-1351, Nov. 2003.

M. Elad and M. Aharon, "Image Denoising Via Learned Dictionaries and Sparse representation," vol. 1, 2006, pp. 895-900.

K. Dabov, A. Foi, V. Katkovnik, and K. Egiazarian, "Image denoising by sparse 3-D transform-domain collaborative filtering," IEEE Trans. on Image Processing, vol. 16, No. 8, pp. 2080-2095, 2007.

\* cited by examiner

DEEP UNFOLDING ALGORITHM FOR EFFICIENT IMAGE DENOISING UNDER VARYING NOISE CONDITIONS

CROSS-REFERENCE TO RELATED APPLICATIONS

This application claims priority to U.S. Provisional Patent Application No. 62/281,889, filed on Jan. 22, 2016 and entitled "Deep Unfolding Algorithm For Efficient Image Denoising Under Varying Noise Conditions," the contents of which are herein incorporated by reference in their entirety.

TECHNOLOGY FIELD

The present invention relates generally to methods, systems, and apparatuses for performing image denoising using a deep folding algorithm under varying noise conditions. The disclosed methods, systems, and apparatuses may be applied to natural scene images as well as medical images from different modalities including Magnetic Resonance Imaging (MRI), Computed Tomography (CT), Ultrasound, etc.

BACKGROUND

Any image acquisition process is inevitably affected by noise, which intensity is a function of acquisition parameters. In radiography, for example, in order to minimize the harmful effects of radiation on the patient, it is necessary to reduce the dose and/or the time of exposure. As the result, obtained low-dose images suffer from noise, which hinders accurate diagnostics, and it becomes paramount to reduce its effect with digital post-processing. This problem is especially important in applications, where multiple images need to be acquired in series during a short interval of time (e.g., to monitor a cardiac intervention surgery with x-ray fluoroscopy). These conditions impose the main requirements on the reconstruction algorithm: it should produce high-quality reconstruction results with minimal artifacts under high (and possibly varying) noise levels in near real time. Our approach effectively addresses both considerations.

There have been a plethora of denoising algorithms proposed over previous decades. Most successful ones to some extent are based on the idea of parsimonious image representations in some domain that concentrates the important information in a few dimensions allowing one to efficiently separate it from isotropic noise. Such methods, however, often rely on iterative solvers, which may not be fast enough for many practical applications. Furthermore, algorithms that treat an image as a collection of its small patches produce effective high-quality results but require slow nearest-neighbor search and tend to create unwanted artifacts under high-level noise conditions. Recently, it was found that machine learning approaches successfully applied in the domain of computer vision can be adapted and produce state-of-the-art results of image reconstruction as well. It is desired to extend these ideas to produce a computationally efficient solution to the problem of image denoising.

SUMMARY

Embodiments of the present invention address and overcome one or more of the above shortcomings and drawbacks, by providing methods, systems, and apparatuses related to a deep unfolding algorithm for efficient image denoising under varying noise conditions. Briefly, the techniques disclosed herein describe a multiscale patch-based image representation for use in an image denoising network. In some embodiments, this network is configured to effectively deal with noise of different levels as well as consider signal dependent Poisson noise, thus allowing a single network to perform at multiple noise levels and noise distributions without having to retrain.

According to some embodiments of the present invention, a computer-implemented method for denoising image data includes denoising an input image using a deep multi-scale network which comprises a plurality of multi-scale networks sequentially connected. Each respective multi-scale network performs a denoising process which includes dividing the input image into image patches and denoising those image patches over multiple levels of decomposition using a threshold-based denoising process. The threshold-based denoising process denoises each respective image patch using a threshold which is scaled according to an estimation of noise present in the respective image patch. The noising process further comprises the assembly of a denoised image by averaging over the image patches.

In some embodiments of the aforementioned method, the threshold-based denoising process applied to each respective image patch is performed by generating non-zero coefficients providing a sparse representation of the respective image patch according to a predetermined dictionary (e.g., learned using a K-SVD process using a plurality of training images). In one embodiment, the threshold is a garrote thresholding function parameterized by the noise level in the patch. Additionally, in some embodiments, the threshold used by the respective multi-scale network is further scaled based on an initial noise estimate corresponding to the respective image patch or residual noise present in the respective image patch following processing by an immediately preceding multi-scale network in the deep multi-scale network. Once the threshold is determined, it is applied to the non-zero coefficients to yield thresholded coefficients. Then, an inverse transform of these thresholded coefficients is determined to yield reconstructed image data representative of the respective image patch.

In some embodiments of the aforementioned method, each of the multi-scale networks is individually trained using a plurality of training images. This training may be performed, for example, by minimizing mean squared error (MSE) of the plurality of training images when processed by the respective multi-scale network. Alternatively, each respective multi-scale network may be trained by maximizing structural similarity (SSIM) of the plurality of training images when processed by the respective multi-scale network. Additionally, in some embodiments, the images used for training may be selected to ensure robustness of the trained network. For example, in one embodiment, each respective multi-scale network is trained using a subset of the plurality of training images which exhibit low peak signal-to-noise when reconstructed by the respective multi-scale network in comparison to other images in the plurality of training images.

According to other embodiments of the present invention, an article of manufacture for denoising image data comprises a non-transitory, tangible computer-readable medium holding computer-executable instructions for performing the aforementioned method, with or without the additional features discussed above.

According to other embodiments of the present invention, a system for denoising image data comprises a neural network, a decomposition component, and an assembly component. The neural network is configured to denoise an image patch. The network includes a first convolutional layer which is configured to perform a decomposition operation on the image patch to yield a plurality of coefficients and a plurality of neurons which are configured to perform non-linear thresholding of the plurality of coefficients. These neurons utilize a threshold (e.g., a garrote thresholding function) which is scaled according to an estimation of noise present in the image patch. The neural network further comprises a second convolutional layer which is configured to perform a reconstruction operation of the image patch on the plurality of coefficients following the non-linear thresholding. The decomposition component utilizes the neural network to recursively denoise subsampled representations of a noisy image using the neural network. The assembly component assembles output of the neural network and the decomposition component into a denoised image.

In some embodiments, the aforementioned system further includes a training component which is configured to train the neural network by simultaneously adjusting weights in all convolutional layers to minimize a loss function between ground truth clean training examples and counterpart examples artificially corrupted with noise. This loss function may be, for example, MSE or structural similarity. In some embodiments, the aforementioned system further comprises a plurality of processors which are configured to parallelize at least one of the decomposition operation, the non-linear thresholding, or the reconstruction operation performed by the neural network.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The following disclosure describes the present invention according to several embodiments directed at methods, systems, and apparatuses which apply deep unfolding algorithm for efficient image denoising under varying noise conditions. The techniques described utilize a deep learning framework which uses a neural network of a specific structure inspired by the workflow of the image processing algorithm. The power of machine learning methods is leveraged and the network is adapted to the properties of the images of interest presented as a training dataset. Additionally, in some embodiments, the network is configured to effectively deal with noise of different levels as well as consider signal dependent Poisson noise, thus allowing a single network to perform at multiple noise levels and noise distributions without having to retrain.

Image denoising is formulated as a problem of reconstructing an estimate $\hat{x}$ of the original image x from its noisy version y obtained as a result of some degradation process. Conventional algorithmic approaches often make some prior assumptions about the desired structure of the thought image. However, the denoising process of each individual image can be viewed as a deterministic mapping, $f: \mathfrak{R}^n \rightarrow \mathfrak{R}^n$, from the space of noisy images to the space of their resulting clean estimates. Although often too complex to be constructed explicitly, the function $f$ can be learned with modern machine learning methods. In fact, the machinery of neural networks as universal approximators has been found recently to be surprisingly effective for this purpose. However, unlike conventional methods that solely rely on learning, the approach discussed herein is based on a process-centric view of traditional signal processing algorithms that elegantly incorporates prior knowledge and expertise into the framework of neural networks. In particular, the disclosed techniques are motivated by the idea of Deep Unfolding, which suggests viewing each step of an iterative algorithm as a layer in a deep network structure and has been successfully used for image reconstruction.

Figure 1:
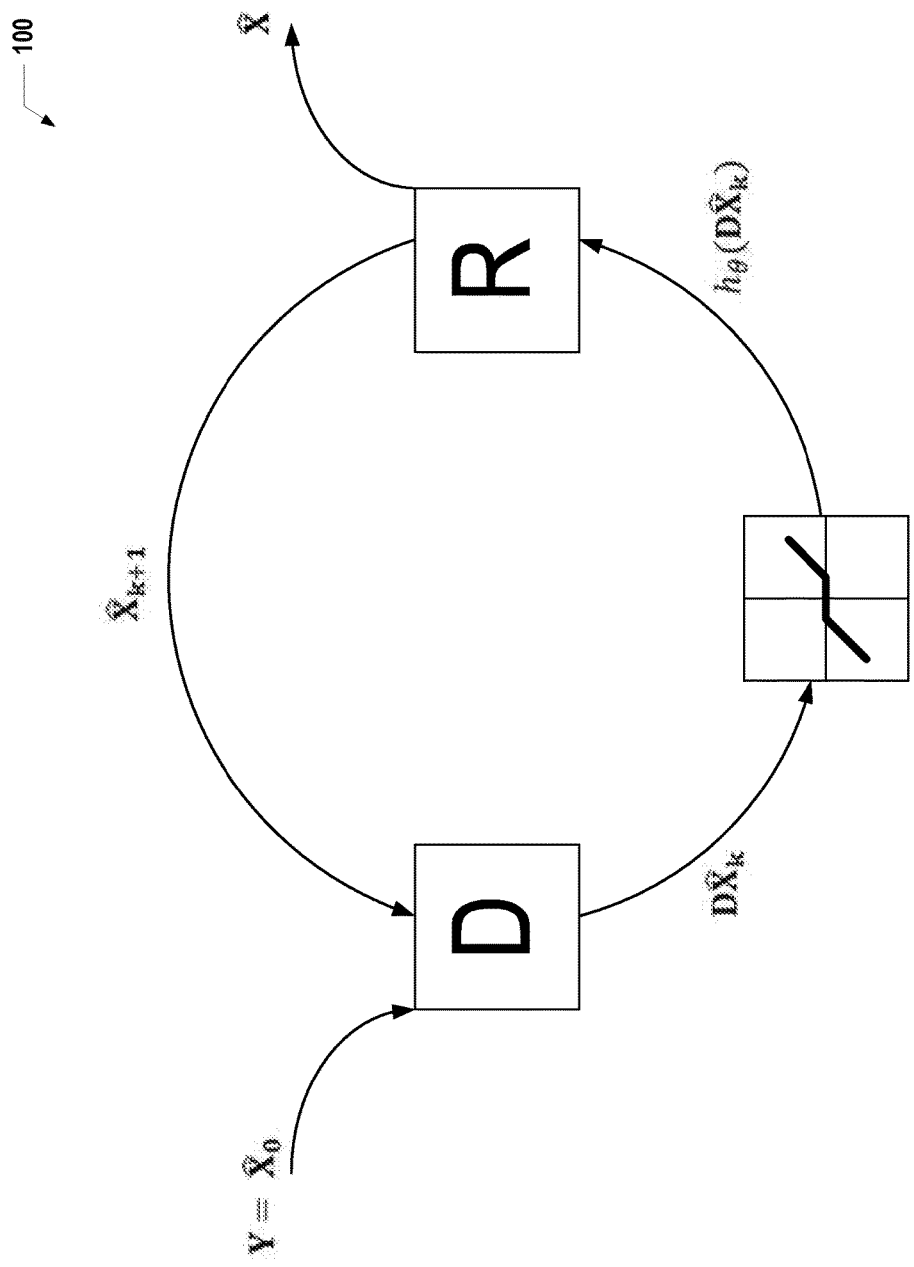
FIG. 1 provides a system view of a system for performing an Image Enhancement Process, according to some of embodiments of the present invention.

FIG. 1 provides a high-level overview of a general iterative algorithm 100 which is used as the basis for the denoising processes presented herein. The algorithm shown in FIG. 1, based on the ideas of sparse coding, assumes that the desired image X can be accurately represented as a linear combination with few non-zero coefficients in some dictionary or basis D. Starting with $Y=\hat{X}_0$, the algorithm attempts to find such a representation by iteratively projecting an estimate onto the elements of D and then thresholding the coefficients with an element-wise non-linearity $h_\theta$ (e.g., soft or hard thresholding). This process is repeated until convergence. Reconstruction is performed with an inverse transform R, and the next-step approximation is found as $x^{k+1} = ax^{(k)} + bR(h_\theta(Dx^{(k)}))$. Thus, the output is recombined with the input after each layer. The weights a and b may be learnt during training.

Figure 2:
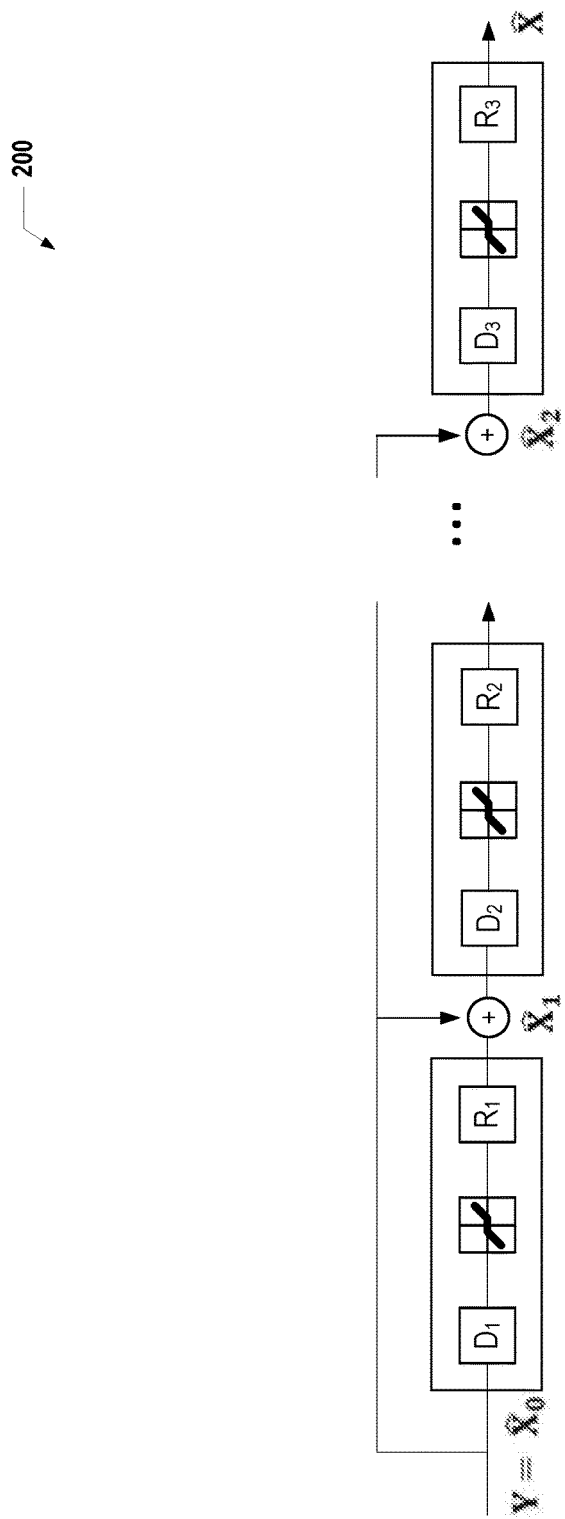
FIG. 2 provides an illustration of deep unfolding system, as it may be applied in some embodiments.

FIG. 2 provides an illustration of deep unfolding system 200, as it may be applied in some embodiments. Here, the iterations shown in FIG. 1 are considered as a neural network with layers corresponding to specific operations of the algorithm 100. In particular, the linear operations of decomposition D and reconstruction R are implemented with convolutional layers, which give us the ability to efficiently operate on images of arbitrary sizes, while shrinkage of the coefficients is performed by neurons with a thresholding nonlinearity as their activation function. Now, the network can be trained in a manner of a denoising autoencoder by adjusting the weights in the layers $D_k$ and $R_K$ to minimize a specific loss function between the ground truth clean training examples and their counterparts artificially corrupted with noise. The loss functions applied by the system 200 may be, for example, a minimization of mean squared error (MSE) or a maximization of structural similarity (SSIM). After training, the network can be regarded as an efficiently evaluated approximation to the sought function $f$ and directly used for fast image denoising. The system 200 illustrated in FIG. 2 offers structure and tunability, providing a good compromise between iterative pursuits unable to adapt to data and purely learned networks. The complexity can be controlled by varying the depth of the network.

Numerous sparsifying transform domains as well as different thresholding rules have been proposed in conventional image processing techniques. While the iterative hard thresholding of orthonormal wavelet coefficients satisfies certain optimality conditions, other more complex transforms ranging from overcomplete directional bases to specifically learned dictionaries have been successfully used within the thresholding framework as well. On the other hand, non-local methods that exploit similarity among small image patches have been found to work exceptionally well for image reconstruction and constitute the core of the conventional state-of-the-art method, Block-Matching and 3D filtering (BM3D). To combine the benefits of these various conventional techniques, overcomplete patch dictionaries are used herein as domains for sparse image representation. That is, each p×q patch is decomposed as a linear combination of the atoms in a dictionary D, a threshold is applied to the found coefficients, and then the denoised image is reconstructed with an inverse transformation R. The resulting image is then assembled by averaging overlapping patches. This scheme is referred to herein as single-level patch-based processing.

Figure 3:
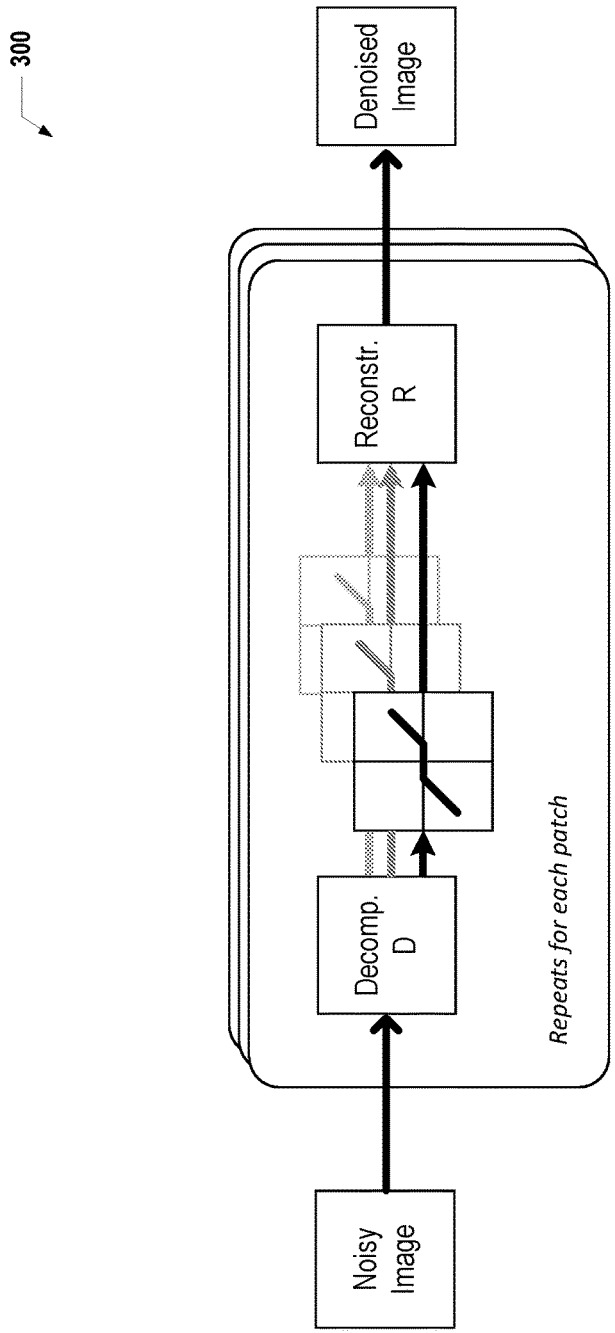
FIG. 3 provides a denoising network which uses a sparse representation with dictionaries for image patches, according to some embodiments.

FIG. 3 provides a denoising network 300 which uses a sparse representation with dictionaries for image patches, according to some embodiments. This network 300 works with small (e.g., 5×5) patches. A dictionary is learned using a technique such as K-SVD to provide a sparse representation of the noisy image which is used to initialize the weights of the network. Each patch is denoised by applying various garrote thresholding functions to the coefficients (the thresholding functions extend into the page in FIG. 3). Overlapping patches are then used to reconstruct the denoised image.

To be able to achieve good quality of reconstruction, larger patch sizes (e.g., 9×9, and 17×17 patches) may be used in the image representation. However, working with larger patches quickly becomes computationally expensive since the number of atoms in the dictionary D grows as well. To overcome this difficulty, the apparent image self-similarity observed across multiple scales may be leveraged to produce a multiscale patch-based image representation. This representation is based on the idea of subsampling the image and processing its smaller versions with the same dictionary of small patches. When the thresholded and reconstructed patches are upsampled back to the original size, this strategy corresponds to processing the initial image with larger (albeit simpler) patches.

Figure 4:
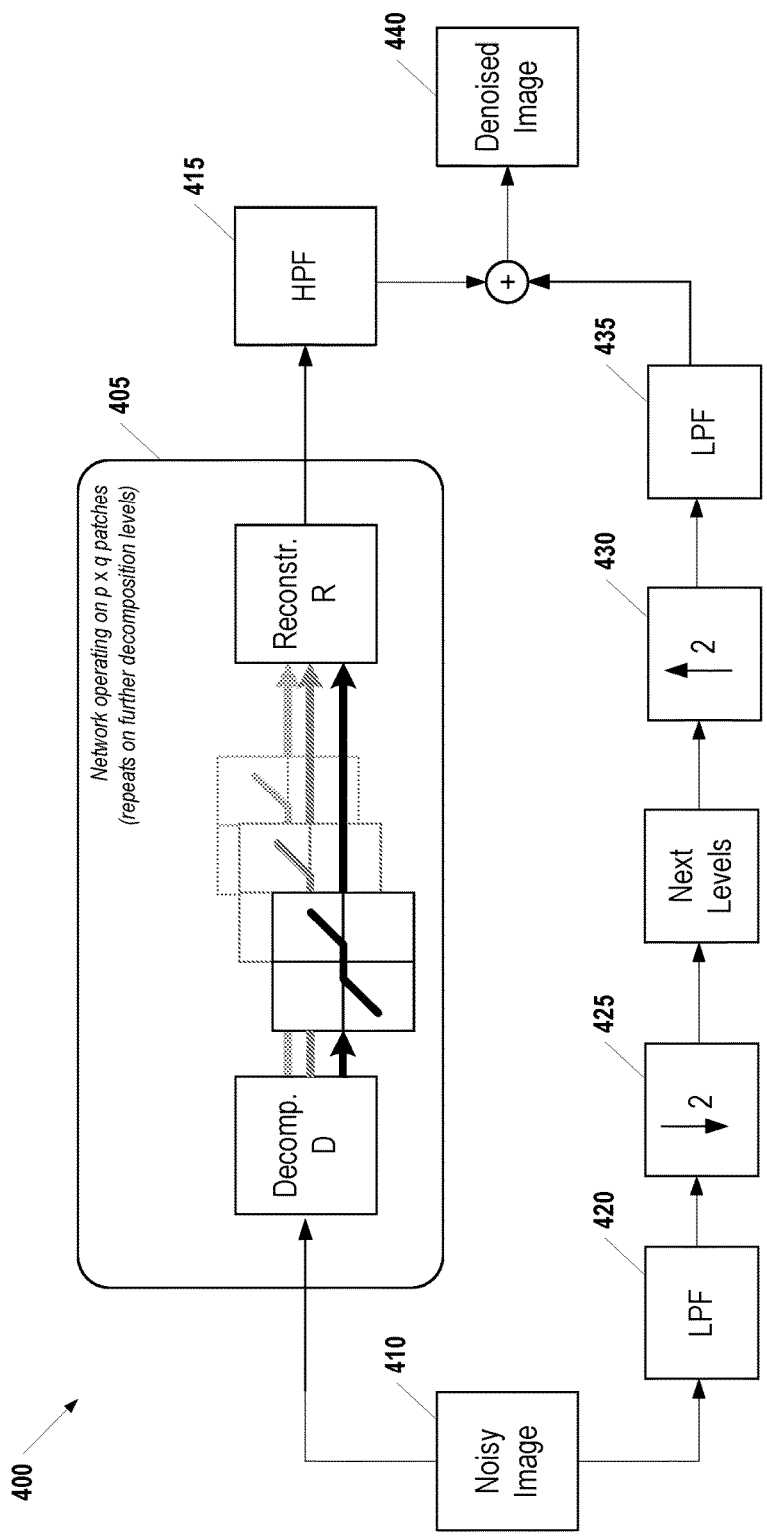
FIG. 4 provides a multiscale patch-based processing system, according to some embodiments.

FIG. 4 provides a multiscale patch-based processing system 400, according to some embodiments. This system 400 combines the advantages of patch-based representations with the computational efficiency of multiscale transforms. Briefly, the system 400 decomposes a noisy image and recursively applies a dictionary-based denoising process similar to that shown in FIG. 3. The system 400 operates on p×q patches, repeating on further decomposition levels. On each level of decomposition, the subsampled image is processed with patches of the same small size (e.g., 5×5 pixels), which effectively results in using larger patches in the original image. The number of levels of the network 405 used for processing may be set to provide a tradeoff between computational complexity and image quality. Additionally, the number of levels may be capped to avoid overprocessing the data in a manner that reduces its overall quality. After reconstruction, a high-pass filter (HPF) 415 is applied to recombine the results. To facilitate decomposition and recursion in the system 400, a low-pass filter (LPF) 420 and a down-sampling operator 425 are applied to the noisy image 410. The downsampled image data is then recursively used as input into the system 400. As denoised data is returned by the system 400 on the subsampled data, an upsampling operator 430 and low-pass filter 435 are applied before combining with the results of the high-pass filter 415 to yield the denoised image 440.

Figure 5:
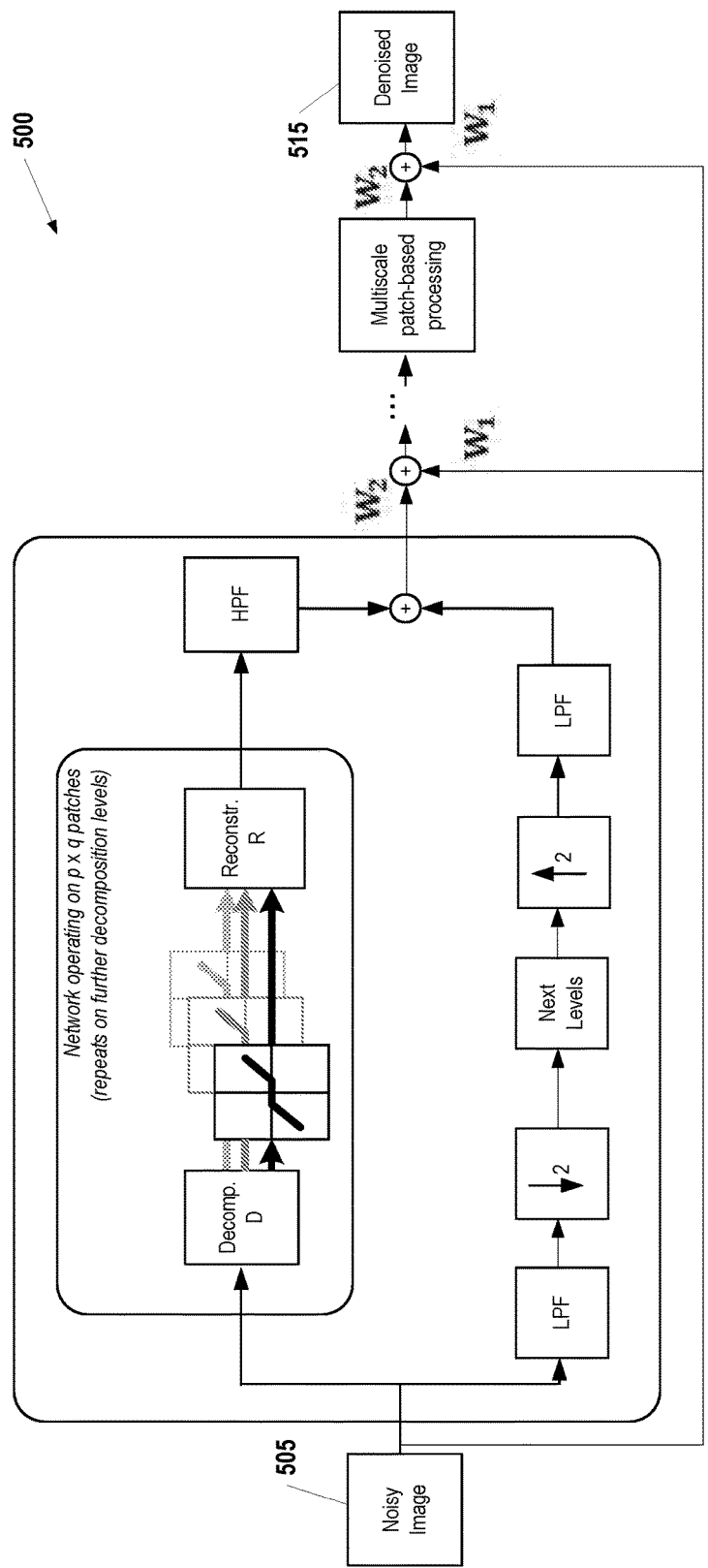
FIG. 5 provides a multiscale patch-based processing system, according to some embodiments, where multiple layers of the network are stacked sequentially to form a deeper network.

To efficiently combine the images reconstructed from patches of different sizes, the single-level patch based processing scheme is combined into a traditional multiscale subsampled representation (such as with an orthogonal wavelet transform) which otherwise achieves perfect reconstruction. Effectively, this places more emphasis on reconstructing higher frequency components (such as sharp edges and fine patterns) with patches of smaller sizes, while low pass filtering in the downsampled branch suppresses the aliasing effects. While the structure presented in FIG. 4 corresponds to a single iteration of the thresholding algorithm, multiple layers of the network may be stacked sequentially to form a deeper network as shown in FIG. 5. After proper initialization (e.g., using a K-SVD dictionary trained on 5×5 patches to initialize the layers D and R and Daubechies wavelets of 4-pixel support for the corresponding low- and high-pass filters), the entire network may be trained with the backpropagation algorithm on the set of training images. This use of multiple layers in a sequential manner has the effect of improving the overall denoising of the data by increasing both the Peak Signal to Noise Ratio (PSNR) and the SSIM of the data.

The system 500 in FIG. 5 may be trained such that each layer learns to reduce the errors/artifacts of the previous layers. The results of each layer (labeled $W_2$ in FIG. 5) are linearly recombined with the original image (labeled $W_1$ in FIG. 5). This combination is then used as input for the next layer in the sequence. After a desired number of layers (i.e., iterations) the output of the final layer is linearly recombined with the original image to produce the final denoised image 515. The number of layers may be set based on a priori knowledge of the image data or typical noise values associated with the imaging modality used to capture the image data. Alternatively, in some embodiments, functionality may be included in the system 500 to check for convergence between different levels as the denoising is recursively performed.

The structure of the systems 400, 500 shown in FIGS. 4 and 5 allow certain techniques to be applied to simplify training. For example, in some embodiments, simple parts of the network (e.g., the single-level patch-based dictionary process) are pre-trained before assembling the larger one (multiscale and/or multilevel networks). In other embodiments, training samples may be selected for each epoch adaptively. As is understood in the art, during iterative training of a neural network such as the networks described herein, an epoch is a single pass through the entire training set, followed by testing of the verification set. The patches corresponding to the lowest PSNR of reconstruction by the current network may be used for each epoch, putting more emphasis on the edges of the image data. In other embodiments, alternative optimization criteria may be used. For example, instead of minimizing MSE, SSIM can be maximized to explicitly penalize poor reconstruction of image details. By tailoring the SSIM parameters, the reconstruction and brightness, contrast, and structural details can be controlled.

The use of thresholding non-linearities as main denoising elements in the networks discussed herein facilitates easily tuning to handle noise of a wide range of (known) variances. In the case of image corruption with additive Gaussian noise, the optimal threshold value $\theta$ is proportional to the standard deviation of noise $\sigma$. Using this knowledge, in some embodiments, the threshold in $h_\theta$ is made to be explicitly dependent on $\sigma$ and its value is scaled accordingly during training as well as inference. Thus, there is no need to retrain the network for different levels of noise.

Figure 6:
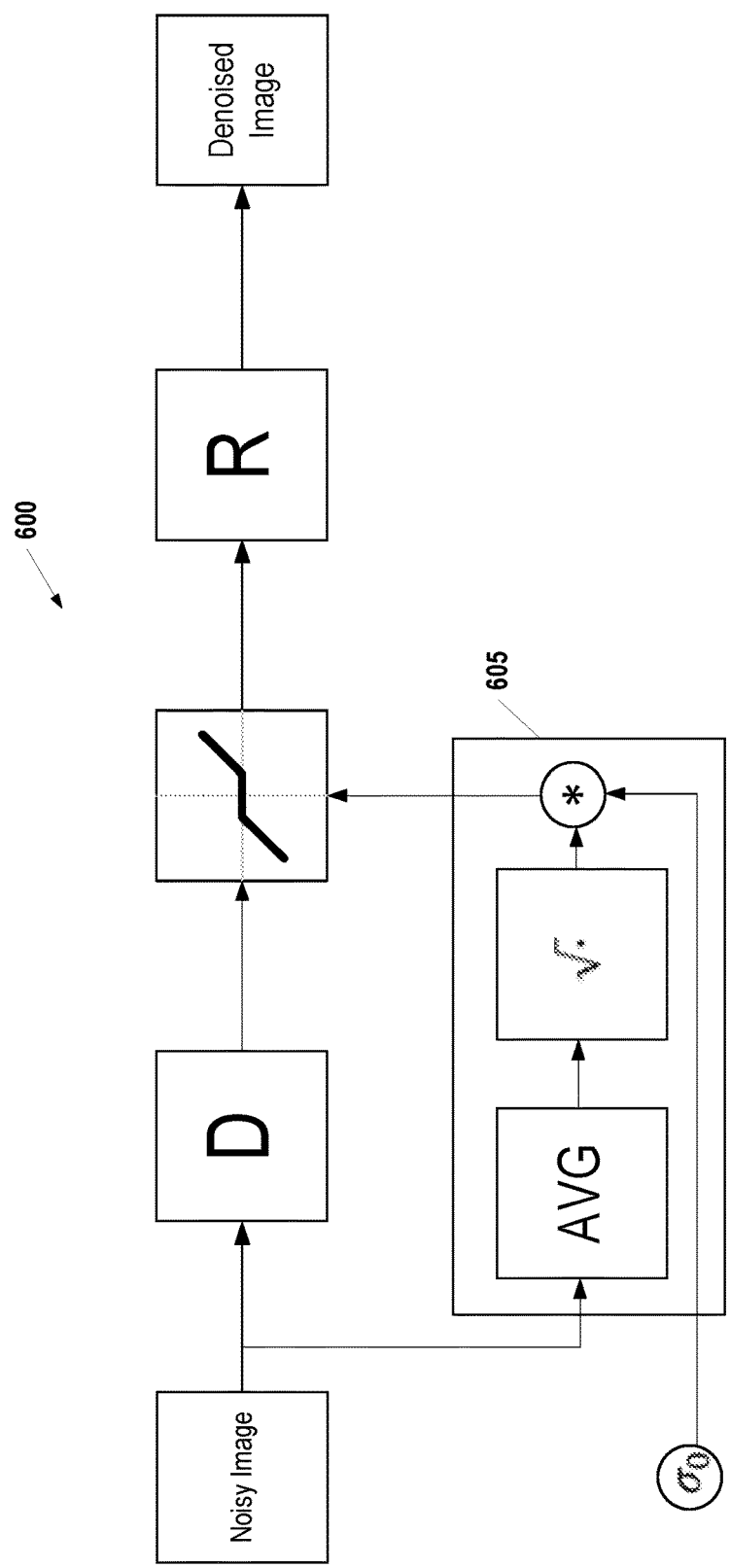
FIG. 6 shows a network which adjusts the threshold to handle different types of noise, according to some embodiments.

FIG. 6 shows a network 600 which adjusts the threshold to handle different types of noise, according to some embodiments. For example, Poisson noise varies according to the square root of the mean of the noise level. Local variance of Poisson noise is assumed to be proportional to the averages of neighboring pixels' intensities computed by convolving the image with the window. As with the earlier denoising procedures discussed above, a deconstruction of the image (D) is performed, followed by thresholding, and reconstruction of the final image result (R). The difference here is that thresholding uses a local estimate of the noise standard deviation $\sigma$ produced by averaging over the entire image, as shown at block 605. As shown in FIG. 6, the local averaging of the image pixels is multiplied with a global noise estimate $\sigma_0$ to yield the local estimate. In case of the additive Gaussian noise, the output of block 605 is set to be identically 1, which makes the resulting threshold depend only on the global estimate of the global noise estimate $\sigma_0$.

The noise affecting images produced by any kind of photon counting process (such as radiography), however, violates the gaussianity assumption and is modeled more accurately as a Poisson process with signal-dependent variance. Even though the noise is not stationary anymore, since the pixel intensities change relatively slow across large image portions, we can assume that the standard deviation of the noise is approximately proportional to the local average of image pixels. Thus, in some embodiments, the thresholds for each image patch are adjusted separately, which allows to handle Poisson noise without performing any variance stabilizing transform.

Figure 7:
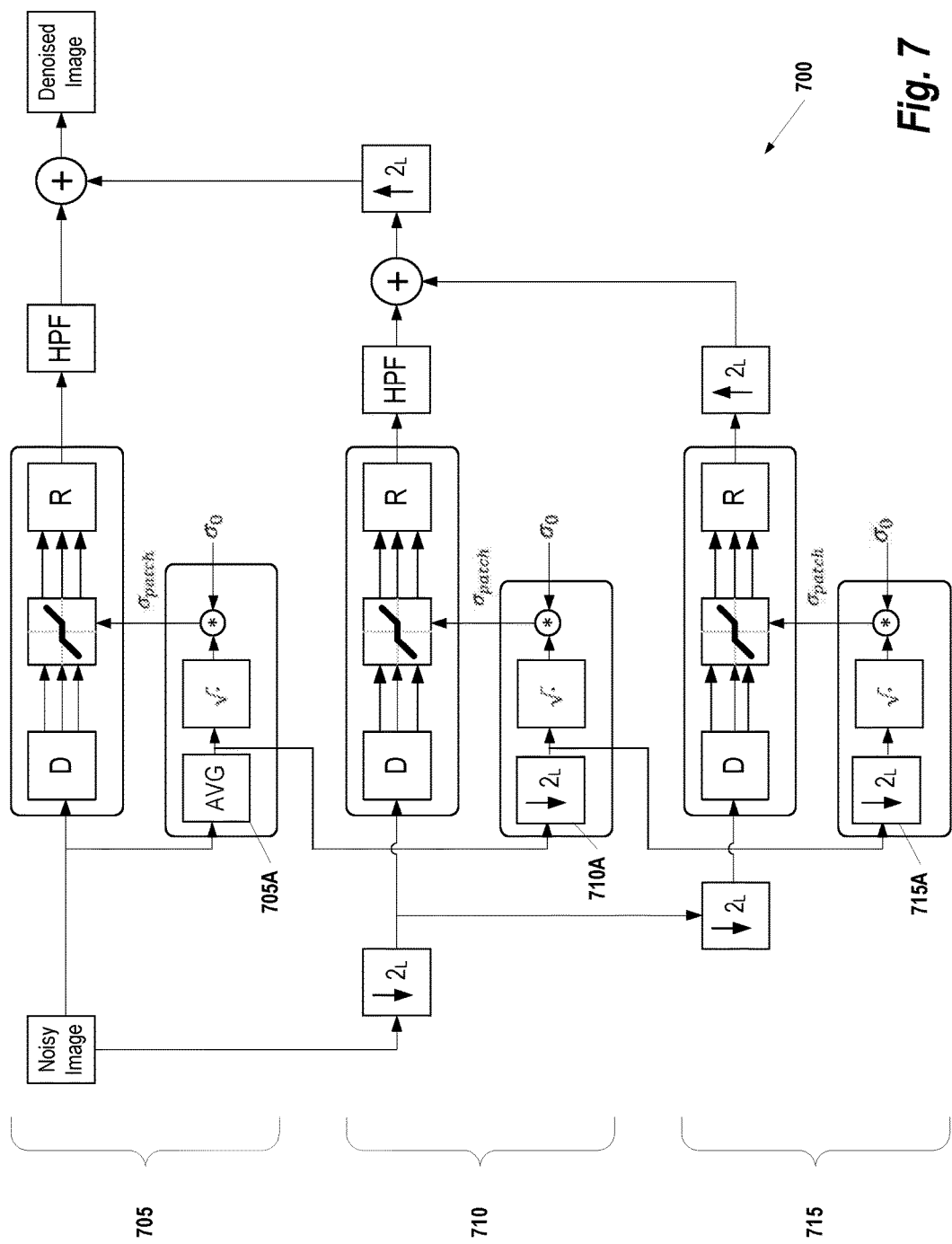
FIG. 7 shows how the concepts discussed above with reference to FIG. 6 may be extended to produce a multiscale patch-based network which removes noise, according to some embodiments.

FIG. 7 shows how the concepts discussed above with reference to FIG. 6 may be extended to produce a multiscale patch-based network 700 which removes noise, according to some embodiments. The network 700 in this example is conceptually divided into three stages. At the first stage 705, averaging component 705A averages over small regions of the noisy image and the result is applied directly in the thresholding function (as described above with reference to FIG. 6). The average generated by component 705A is also used as input to a downsampling component 710A at stage 710. Stage 710 generates a noise estimate based on the downsampled average and uses its respective thresholding function. The downsampled averaged generated by the downsampling component 710A is also used as input to a downsampling component 715A at stage 715. This downsampling component 715A downsamples the average a second time and uses it in the thresholding function applied at stage 715. Finally, the results of each stage are upsampled and processed with high pass filters, as appropriate before being linearly combined to produce the denoised image.

Figure 8:
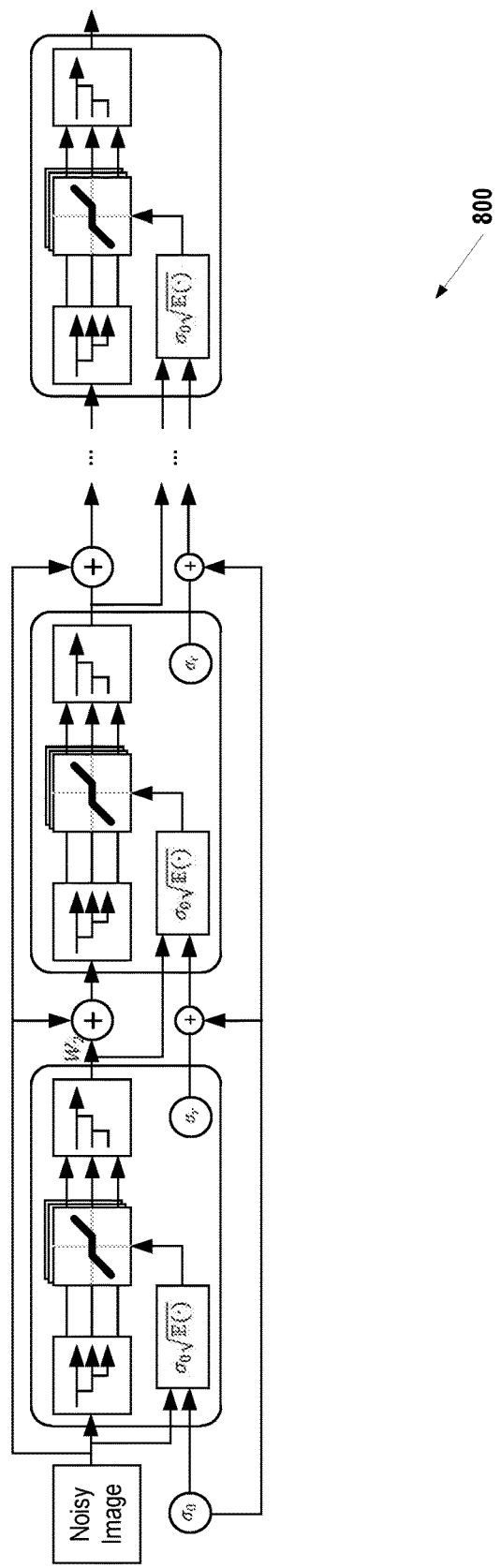
FIG. 8 illustrates a deep multi-scale patch-based network where Poisson noise is removed, according to some embodiments.

FIG. 8 illustrates a deep multi-scale patch-based network 800 where Poisson noise is removed, according to some embodiments. Here, several multi-scale networks are connected sequentially. On each layer, the current "cleaned" image is used to estimate the Poisson noise variance. Initially, pre-blurring is performed to get a local mean. From local mean, the initial noise level $\sigma_0$ is determined which will serve as the input to the denoising. As processing propagates from layer to layer, each layer needs to denoise what is left from its previous level (i.e., what noise is left from the previous level). This is represented by $\sigma_r$. So, as multi-scale patch-based network 800 proceeds through different networks, the noise is thresholded less and less.

Figure 9:
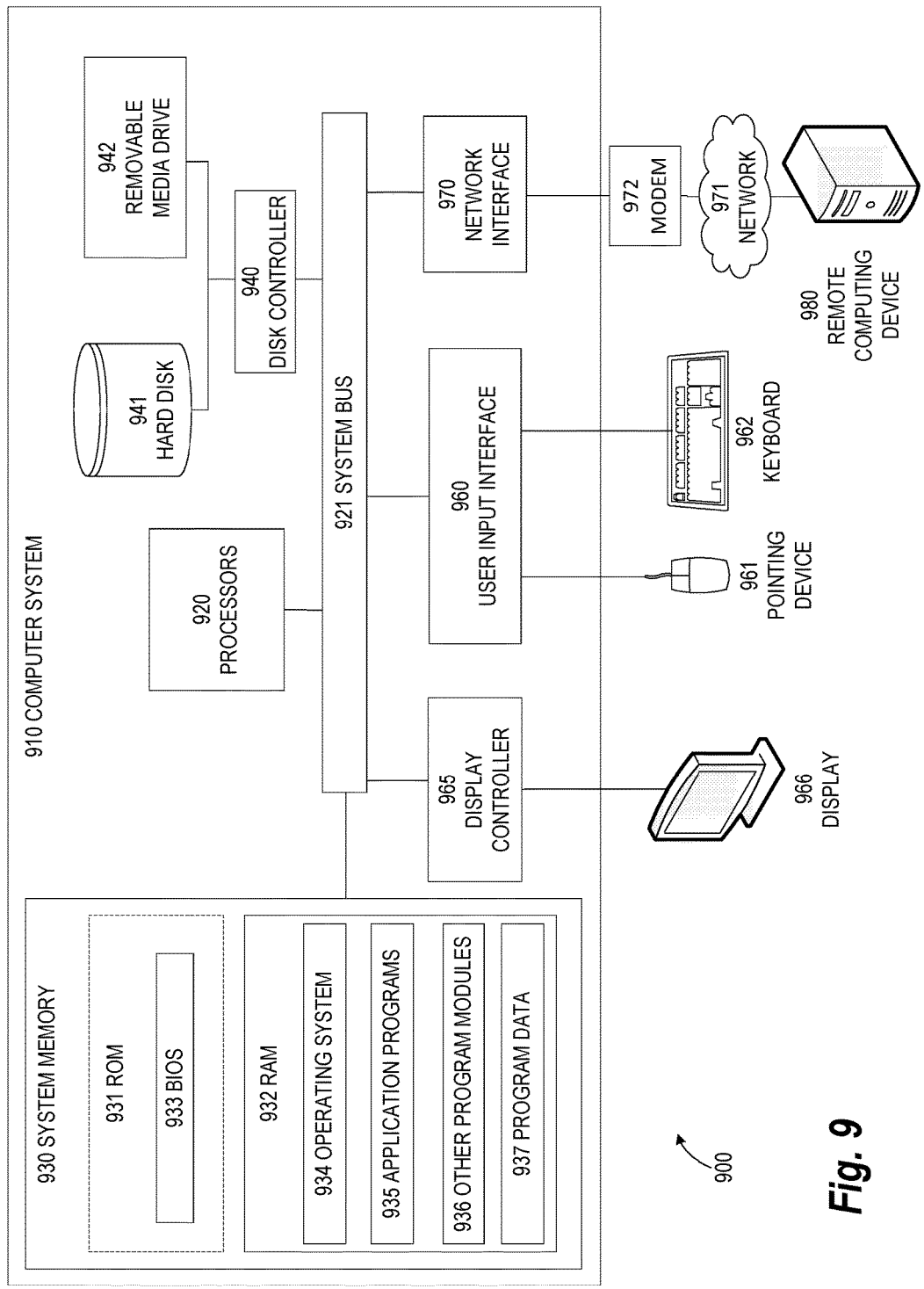
FIG. 9 illustrates an exemplary computing environment within which embodiments of the invention may be implemented.

FIG. 9 illustrates an exemplary computing environment 900 within which embodiments of the invention may be implemented. For example, computing environment 900 may be used to implement one or more of the deep multiscale patch-based networks described herein. Computers and computing environments, such as computer system 910 and computing environment 900, are known to those of skill in the art and thus are described briefly here.

As shown in FIG. 9, the computer system 910 may include a communication mechanism such as a system bus 921 or other communication mechanism for communicating information within the computer system 910. The computer system 910 further includes one or more processors 920 coupled with the system bus 921 for processing the information.

The processors 920 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 9, the computer system 910 also includes a system memory 930 coupled to the system bus 921 for storing information and instructions to be executed by processors 920. The system memory 930 may include computer readable storage media in the form of volatile and/or nonvolatile memory, such as read only memory (ROM) 931 and/or random access memory (RAM) 932. The RAM 932 may include other dynamic storage device(s) (e.g., dynamic RAM, static RAM, and synchronous DRAM). The ROM 931 may include other static storage device(s) (e.g., programmable ROM, erasable PROM, and electrically erasable PROM). In addition, the system memory 930 may be used for storing temporary variables or other intermediate information during the execution of instructions by the processors 920. A basic input/output system 933 (BIOS) containing the basic routines that help to transfer information between elements within computer system 910, such as during start-up, may be stored in the ROM 931. RAM 932 may contain data and/or program modules that are immediately accessible to and/or presently being operated on by the processors 920. System memory 930 may additionally include, for example, operating system 934, application programs 935, other program modules 936 and program data 937.

The computer system 910 also includes a disk controller 940 coupled to the system bus 921 to control one or more storage devices for storing information and instructions, such as a magnetic hard disk 941 and a removable media drive 942 (e.g., floppy disk drive, compact disc drive, tape drive, and/or solid state drive). Storage devices may be added to the computer system 910 using an appropriate device interface (e.g., a small computer system interface (SCSI), integrated device electronics (IDE), Universal Serial Bus (USB), or FireWire).

The computer system 910 may also include a display controller 965 coupled to the system bus 921 to control a display or monitor 966, such as a cathode ray tube (CRT) or liquid crystal display (LCD), for displaying information to a computer user. The computer system includes an input interface 960 and one or more input devices, such as a keyboard 962 and a pointing device 961, for interacting with a computer user and providing information to the processors 920. The pointing device 961, for example, may be a mouse, a light pen, a trackball, or a pointing stick for communicating direction information and command selections to the processors 920 and for controlling cursor movement on the display 966. The display 966 may provide a touch screen interface which allows input to supplement or replace the communication of direction information and command selections by the pointing device 961.

The computer system 910 may perform a portion or all of the processing steps of embodiments of the invention in response to the processors 920 executing one or more sequences of one or more instructions contained in a memory, such as the system memory 930. Such instructions may be read into the system memory 930 from another computer readable medium, such as a magnetic hard disk 941 or a removable media drive 942. The magnetic hard disk 941 may contain one or more datastores and data files used by embodiments of the present invention. Datastore contents and data files may be encrypted to improve security. The processors 920 may also be employed in a multi-processing arrangement to execute the one or more sequences of instructions contained in system memory 930. In alternative embodiments, hard-wired circuitry may be used in place of or in combination with software instructions. Thus, embodiments are not limited to any specific combination of hardware circuitry and software.

As stated above, the computer system 910 may include at least one computer readable medium or memory for holding instructions programmed according to embodiments of the invention and for containing data structures, tables, records, or other data described herein. The term "computer readable medium" as used herein refers to any medium that participates in providing instructions to the processors 920 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 941 or removable media drive 942. Non-limiting examples of volatile media include dynamic memory, such as system memory 930. Non-limiting examples of transmission media include coaxial cables, copper wire, and fiber optics, including the wires that make up the system bus 921. Transmission media may also take the form of acoustic or light waves, such as those generated during radio wave and infrared data communications.

The computing environment 900 may further include the computer system 910 operating in a networked environment using logical connections to one or more remote computers, such as remote computing device 980. Remote computing device 980 may be a personal computer (laptop or desktop), a mobile device, a server, a router, a network PC, a peer device or other common network node, and typically includes many or all of the elements described above relative to computer system 910. When used in a networking environment, computer system 910 may include modem 972 for establishing communications over a network 971, such as the Internet. Modem 972 may be connected to system bus 921 via user network interface 970, or via another appropriate mechanism.

Network 971 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 910 and other computers (e.g., remote computing device 980). The network 971 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 971.

Aside from the computing environment 900 shown in FIG. 9, the methods and systems described herein may be implemented in more specialized computing environments which may offer additional benefits. For example, in some embodiments, a plurality of processors may be configured to parallelize at least one of the decomposition operations, the non-linear thresholding, and/or the reconstruction operations performed by the neural networks described above. These processors may be arranged, for example, in a parallel computing platform using technologies such as Apache Spark™ or NVIDIA CUDA™.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation(s) without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A computer-implemented method for denoising image data, the method comprising:
   receiving, a computer system, an input image comprising noisy image data;
   denoising, by the computer system, the input image using a deep multi-scale network comprising a plurality of multi-scale networks sequentially connected, wherein each respective multi-scale network performs a denoising process comprising:
      dividing the input image into a plurality of image patches,
      denoising the plurality of image patches over multiple levels of decomposition using a threshold-based denoising process, wherein the threshold-based denoising process denoises each respective image patch using a threshold which is scaled according to an estimation of noise present in the respective image patch;
      assembling a denoised image by averaging over the plurality of image patches.

2. The method of claim 1, wherein the estimation of noise present in the respective image patch is based on a standard deviation of noise present in the respective image patch.

3. The method of claim 1, wherein the threshold-based denoising process applied to each respective image patch comprises:
   generating a plurality of non-zero coefficients providing a sparse representation of the respective image patch according to a predetermined dictionary;
   applying the threshold to the plurality of non-zero coefficients to yield a plurality of thresholded coefficients; and
   determining an inverse transform of the plurality of thresholded coefficients to yield reconstructed image data representative of the respective image patch.

4. The method of claim 3, wherein the threshold is a garrote thresholding function parameterized by the noise level in the patch.

5. The method of claim 3, wherein the threshold used by the respective multi-scale network is further scaled based on one of:
   an initial noise estimate corresponding to the respective image patch, or
   residual noise present in the respective image patch following processing by an immediately preceding multi-scale network in the deep multi-scale network.

6. The method of claim 3, wherein the predetermined dictionary is learned using a K-SVD process using a plurality of training images.

7. The method of claim 1, further comprising:
   individually training each of the plurality of multi-scale networks using a plurality of training images.

8. The method of claim 7, wherein each respective multi-scale network is trained by minimizing mean squared error (MSE) of the plurality of training images when processed by the respective multi-scale network.

9. The method of claim 7, wherein each respective multi-scale network is trained by maximizing structural similarity (SSIM) of the plurality of training images when processed by the respective multi-scale network.

10. The method of claim 7, wherein each respective multi-scale network is trained using a subset of the plurality of training images which exhibit low peak signal-to-noise when reconstructed by the respective multi-scale network in comparison to other images in the plurality of training images.

11. A system for denoising image data, the system comprising:
    a neural network configured to denoise an image patch, the neural network comprising:
       a first convolutional layer configured to perform a decomposition operation on the image patch to yield a plurality of coefficients;
       a plurality of neurons configured to perform non-linear thresholding of the plurality of coefficients, wherein the plurality of neurons utilize a threshold which is scaled according to an estimation of noise present in the image patch;
       a second convolutional layer configured to perform a reconstruction operation of the image patch on the plurality of coefficients following the non-linear thresholding;

a decomposition component configured to recursively utilize the neural network to recursively denoise sub-sampled representations of a noisy image using the neural network; and an assembly component configured to assemble output of the neural network and the decomposition component into a denoised image.

12. The system of claim 11, further comprising:

a plurality of processors configured to parallelize at least one of the decomposition operation, the non-linear thresholding, or the reconstruction operation performed by the neural network.

13. The system of claim 11, further comprising a training component which is configured to train the neural network by simultaneously adjusting weights in all convolutional layers to minimize a loss function between ground truth clean training examples and counterpart examples artificially corrupted with noise.

14. The system of claim 13, wherein mean squared error (MSE) is used as the loss function.

15. The system of claim 13, wherein structural dissimilarity is used as the loss function.

16. The system of claim 11, wherein the threshold is a garrote thresholding function.

17. The system of claim 11, the threshold is further scaled based on on residual noise present in the respective image patch following processing by an immediately preceding execution of the neural network by the decomposition component.

18. An article of manufacture for denoising image data, the article of manufacture comprising a non-transitory, tangible computer-readable medium holding computer-executable instructions for performing a process comprising:

denoising an input image comprising noisy image data using a deep multi-scale network comprising a plurality of multi-scale networks sequentially connected, wherein each respective multi-scale network performs a denoising process comprising:

dividing the input image into a plurality of image patches, denoising the plurality of image patches over multiple levels of decomposition using a threshold-based denoising process, wherein the threshold-based denoising process denoises each respective image patch using a threshold which is scaled according to an estimation of noise present in the respective image patch;

assembling a denoised image by averaging over the plurality of image patches.

19. The article of manufacture of claim 18, wherein the threshold-based denoising process applied to each respective image patch comprises:

generating a plurality of non-zero coefficients providing a sparse representation of the respective image patch according to a predetermined dictionary;

applying the threshold to the plurality of non-zero coefficients to yield a plurality of thresholded coefficients; and determining an inverse transform of the plurality of thresholded coefficients to yield reconstructed image data representative of the respective image patch.

20. The article of manufacture of claim 18, wherein the threshold used by the respective multi-scale network is further scaled based on one of:

an initial noise estimate corresponding to the respective image patch, or residual noise present in the respective image patch following processing by an immediately preceding multi-scale network in the deep multi-scale network.

* * * * *